United States Patent [19]

Ohlson

[11] 3,868,262
[45] Feb. 25, 1975

[54] METHODS IN THE PRODUCTION OF PLANT-MIXED ASPHALT CONCRETE

[76] Inventor: Karl Gunnar Ohlson, Vikingaleden 28, Hassleholm, Sweden

[22] Filed: July 20, 1973

[21] Appl. No.: 381,130

Related U.S. Application Data

[63] Continuation-in-part of Ser. No. 193,205, Oct. 27, 1971, abandoned, which is a continuation-in-part of Ser. No. 137,701, April 26, 1971, abandoned.

[52] U.S. Cl............. 106/281 R, 106/275, 106/280, 404/81
[51] Int. Cl...................... C08h 13/00, C08h 17/04
[58] Field of Search ........ 106/280, 281, 275; 94/20, 94/23

[56] References Cited
UNITED STATES PATENTS

| | | | |
|---|---|---|---|
| 2,943,240 | 6/1960 | Mastiney | 106/281 |
| 3,352,702 | 11/1967 | Leitner | 106/281 |

Primary Examiner—Joan E. Welcome
Attorney, Agent, or Firm—Browne, Beveridge, Degrandi & Kline

[57] ABSTRACT

In a method for the production of a plant-mixed asphalt mix for paving purposes by mixing a batch of bituminous binder and a batch of mineral aggregate in a mixer at a temperature at which the binder has a viscosity of at least 150 cSt, the batch of mineral aggregate containing both particles above 2 mm and particles within the range of 2–0.5 mm and also smaller particles, the batch of mineral aggregate is divided into a first and a second part in such a way that said second part contains particles of said mineral aggregate batch within the range 2–0.5 mm, and said first part of the mineral aggregate batch is first mixed with the binder batch before said second part of the mineral aggregate batch is introduced into the mixer.

4 Claims, No Drawings

METHODS IN THE PRODUCTION OF PLANT-MIXED ASPHALT CONCRETE

The present application is a continuation-in-part of application, Ser. No. 193,205 filed Oct. 27, 1971 and now abandoned, which is in turn a continuation-in-part of application, Ser. No. 137,701, filed Apr. 26, 1971 and now abandoned; which applications are relied upon and the entire disclosure and specifications of which are hereby incorporated by reference.

This invention relates to a method for the production of a plant-mixed asphalt mix for paving purposes, according to which mineral aggregate as well as a bituminous binder are heated and mixed in heated condition.

Specifications have been issued regarding the quality of the materials used for such hot mixed asphalt mixes, and these specifications are applicable also to the present invention. According to the specifications, the bituminous binder employed usually shall have a viscosity of 500 centistokes at a temperature of 120°–140°C, or a penetration of 50–500 at 25°C. The mineral aggregate shall consist of particles or fragments of different size. The mineral aggregate preferably consists of crushed mineral, but also gravel and sand may be used. The maximum size of the mineral particles may vary considerably for different types of asphalt mixes, for instance from a maximum size of 4 mm up to a maximum size of 32 mm, or higher.

In present production methods, all mineral aggregate is dried and heated and then introduced into a mixer and is dry-mixed for about 10 to 15 seconds, whereupon the designed amount of bituminous binder heated to the specified temperature is introduced into the mixer where mixing is continued for a suitable period of time. The total mixing cycle is normally less than 1 minute. The resulting asphalt mix is then removed from the mixer and conveyed to the construction site where the mix is laid in hot condition on a prepared base and is compacted by rolling.

It has been found that pavings obtained by using the known mixing methods lack in quality due to inhomogeneity showing dense regions with concentration of fine mineral aggregate particles and binder, and open graded regions with lack of fine mineral aggregate particles and binder. Due to the lack of fine particles and low binder content in the open graded regions the mineral aggregate in those regions will be loosened from the paving surface by the traffic instead of - as intended - to be worn by the traffic. Due to the intensity with which these open graded regions appear in the paving surface these open graded regions with the property of unnormal wearing will therefore govern the time for resurfacing. The dense regions have a tendency to bleed due to the high binder content and low stability.

One object of the invention is to provide an improved method for the production of a plant-mixed asphalt mix having high homogeneity without separations in the mineral aggregate composition.

A second object of the invention is to control the binder content on the larger mineral aggregate particles.

A third object of the invention is to control the tendency of the mineral aggregate portion comprising particles with a size of approximately 2 mm and smaller to deprive the coarser particles of binder.

A fourth object of the invention is to achieve the expected effective binder content of the mix.

A fifth object of the invention is to provide mixes for the construction of pavings with surfaces where the large aggregate particles of the mix dominate the surface of the paving with the fine material as a mortar inbetween.

A sixth object of the invention is to create a mortar part in the mix which gives control over the qualities of the pavings made from the mix.

In order to achieve the above objects and other objects appearing from the following description the invention provides an improvement in a method for the production of a plant-mixed asphalt mix for paving purposes by mixing a batch of bituminous binder and a batch of mineral aggregate in a mixer at a temperature at which said binder has a viscosity of at least 150 cSt, said batch of mineral aggregate containing both particles above 2 mm and particles within the range of 2–0.5 mm and also smaller particles, said batch of mineral aggregate being divided into a first and a second part, said first part being first mixed in the mixer with said batch of binder whereafter said second part is introduced into the mixer and the mixing is continued until mixing is completed. The improvement according to the invention comprises dividing said batch of mineral aggregate into said first and second parts in such a way that said second part contains particles of said mineral aggregate batch within the range 2–0.5 mm and smaller.

It has been found that mineral aggregate particles having sizes above 2 mm form the stabilizing or structural part of the mix while the smaller particles of 2 mm and less form with the binder liquid a plastic mortar between the structural particles. In order to obtain high stability and other good qualities of the mix it is important that the mortar is evenly distributed between the structural particles, i.e. that the mix is homogeneous, so that there are no concentrations of plastic mortar giving regions with reduced stability. It has been found that mineral aggregate particles having sizes of 0–2 mm will agglomerate when mixed with free bituminous binder liquid. This is one of the main reasons why the above-mentioned presently used methods of mixing fail to give pavings with optimal qualities. Furthermore, it has been found that small particles below about 0.5 mm are easily retained in the binder liquid. Those small particles constitute only a small part of the asphalt mix mortar which has been found to be constituted by particles up to 2 mm. There are problems in forming an evenly distributed mortar part of the particles between 0.5 and 2 mm as such particles are not so easily retained in the binder liquid as the smaller ones. These problems are solved by the method according to the invention in which particles within the range 0.5–2 mm, which is so important for the mortar part of the mix, are introduced into the mixer at a stage in which the structural particles have already been coated with a binder film in which said mortar particles are caught and enclosed. To reach the effect aimed at it is imperative that almost all of the binder of the mix is bound in the binder film on the faces of the structural particles. If the viscosity of the binder liquid in the mixer is too low the film on the surfaces of the structural particles will be too thin for catching and and enclosing the mortar particles (especially particles within the range 0.5–2 mm) and free binder liquid will be present in the mixer which can form agglomerations when the mortar particles are introduced. Therefore, in using the present invention the viscosity of the binder must be controlled.

The improvement of the method according to the invention can be noted already at a mixing binder viscosity of 150 cSt, and normally mixing is carried out at a binder viscosity of 200–500 cSt depending on the composition of the mineral aggregate. Trial mixes have been carried out up to a binder viscosity of 2000 cSt with good results. The upper limit for viscosity will be determined by the required workability of the mix.

In order to obtain the beneficial results of the invention it is imperative that particles of the mineral aggregate batch having sizes between 0.5 and 2 mm are kept back from the first mixing step and are introduced into the mixer during the second mixing step, so that said particles will not be contacted by free binder liquid and form agglomerations with excessive binder content but will come into contact with binder coatings of the structural particles (sizes above 2 mm) of the mineral aggregate batch and thereby convert the coatings into an evenly distributed mortar. The improvements obtained by the present invention in relation to the presently used mixing methods referred to above are noted already when at least 10 % by weight of the particles belonging to the group 0.5 to 2 mm of the mineral aggregate batch are added during the second mixing step, and in most cases the best results are obtained when at least 50 % by weight of the particles belonging to the group 0.5 to 2 mm of the mineral aggregate batch are added during the second mixing step.

The known methods have no control over the distribution of the 0–2 mm aggregate particles which have been found to form a plastic mass with the binder. In the known methods an extensive part of these particles exists nonretained in the mix and thereby creates a fluffy consistency which leads to a dominance of this material in the mix and pavings. This fluffiness creates a larger requirement of binder in that a larger amount of the aggregate becomes free particles. This will lower the effective binder content of the mix and paving. It has been found that by using the invention the 0–2 mm material can be bound in the binder liquid and thereby be restrained from forming fluffiness. The material that is enclosed in the liquid in this way can be assumed to make binder liquid to the same amount as their own volume available to the larger particles. This is one of the reasons why it is so important that the larger particles in the 0–2 mm fraction are kept back in order to be bound in the binder film on the structural part of the mineral aggregate. This ratio between the volume of a particle and the surface area of the same particle increases with particle size. The bonding of particles in the binder liquid requires a high binder content on the structural part. This high binder content is obtained by the reduction of the aggregate surface area in the first mixing step by keeping back the mortar particles according to the invention. In retaining the mortar part in the liquid films as described above the mix takes on a richer look. This is the sign that the effective binder content has been increased and that the mortar particles are confined in the joints of the structural particles. A paving made by such a mix will show a surface which is rich in large particles. Such a paving surface cannot be obtained by the known mixing methods because of their inability to form and retain the mortar part of the mix. Special methods have been developed to enrich the surface of a paving with coarse particles but they are more expensive in use than the method according to the invention which in a natural and simple way leads to paving surfaces rich in coarse particles. An aim of the invention is to increase the effective binder content in the mix in relation to the total binder content. Mixers with higher agitation, i.e. shorter mixing time, have been found to increase the effect of the invention. The common laboratory mixers will not create the effect.

The improved results obtained when using the invention are demonstrated by the following example. Example: Four asphalt mixes A, B, C and D for paving purposes were prepared using the same specification for the mineral aggregate batch which had a continuous grading curve and the following composition:

|  | Particle size |
|---|---|
| 75.4 % by weight crushed gravel | 2–12 mm |
| 18.8 % by weight sand | 0.09–2 mm |
| 5.8 % by weight filler | 0–0.09 mm |

The bituminous binder used was in each case a petroleum binder having a penetration of 80 at 25°C. In each case the binder batch and the mineral aggregate batch were pre-heated to a mixing temperature of about 150°C before introduction into the mixer. At said mixing temperature the binder had a viscosity of about 200 cSt.

Mix A: This mix was prepared in the usual known manner, i.e. the whole mineral aggregate batch was first introduced into the mixer and then the binder batch was added and mixing was completed in the usual manner. The binder batch amounted to 4.5 % by weight of the mineral aggregate batch.

Mix B: This mix was prepared according to one embodiment of the invention. The crushed gravel having particle sizes within the range of 2 to 12 mm was first introduced into the mixer, whereupon the whole binder batch was added and mixing was continued for about 15 seconds. The sand and filler portions of the mineral aggregate batch were then added, and mixing was continued for about 15 seconds, whereupon the mix was removed from the mixer. Also in this case the binder batch amounted to 4.5 % by weight of the mineral aggregate batch.

Mix C: This mix was prepared according to another embodiment of the invention. The crushed gravel and about 50 % of the sand (9.6 % by weight of the whole batch) were first introduced into the mixer, whereupon the whole binder batch was added and mixing was continued for about 15 seconds. The rest of the sand (9.2 % by weight of the whole batch) and the filler were then added, and mixing was continued for about 15 seconds, whereupon the mix was removed from the mixer. Also in this case the binder batch amounted to 4.5 % by weight of the mineral aggregate batch.

Mix D: This mix was a repetition of Mix C with the exception that the binder batch amounted to 3.7 % by weight of the mineral aggregate batch.

The mixes A to D were tested as to Marshall stability and apparent density. The test results are shown in the following table.

|  | Mix | | | |
|---|---|---|---|---|
|  | A | B | C | D |
| Marshall stability kgs | 390 | 650 | 500 | 420 |
| Apparent density g/cm³ | 2.60 | 2.58 | 2.60 | 2.62 |

In comparison with Mix A made according to the known method Mix B, where all sand and filler were added in a second mixing step, shows a surprisingly great improvement of the Marshall stability; Mix C, where only 50 % of the sand and all filler were added in a second mixing step, shows also a great improvement of the Marshall stability; and Mix D shows that an essential improvement of the Marshall stability can be obtained with a reduced amount of binder. The apparent density was about the same in all cases.

The improved results of the invention are due to
1. the even distribution of all material in the mix,
2. the increased effective binder content created by the invention.

All parts of the present application incorporate the tolerances prevailing in the production of plant mixes with respect to measuring and handling such mixes.

What I claim and desire to secure by Letters Patent is:

1. In a method for the production of stable homogeneous a plant-mixed asphalt mix for paving purposes by mixing a batch of bituminous binder and a batch of mineral aggregate in a mixer at a temperature at which said binder has a viscosity of at least 150 cSt, said batch of mineral aggregate containing both particles above 2 mm and particles within the range of 2–0.5 mm and also smaller particles, said batch of mineral aggregate being divided into a first and a second part, said first part being first mixed in the mixer with said batch of binder whereafter said second part is introduced into the mixer and the mixing is continued until mixing is completed, the improvement comprising dividing said batch of mineral aggregate into said first and second parts in such a way that said second part contains particles of said mineral aggregate batch within the range 2–0.5 mm and smaller, whereby said bituminous binder and mineral aggregate produce a mixture having high homogeneity without separations in the mineral aggregate composition and without agglomeration of particle sizes within the range 2–0.5mm.

2. The improvement according to claim 1, in which said batch of mineral aggregate is divided into said first and second parts in such a way that said second part contains at least 10 % by weight of the particles of said mineral aggregate batch within the range 2–0.5 mm.

3. The improvement according to claim 1, in which said batch of mineral aggregate is divided into said first and second parts in such a way that said second part contains at least 50 % by weight of the particles of said mineral aggregate batch within the range of 2–0.5 mm.

4. In a method for the production of stable homogeneous a plant-mixed asphalt mix for paving purposes by mixing a batch of bituminous binder and a batch of mineral aggregate in a mixer at a temperature at which said binder has a viscosity of 200–500 cSt, said batch of mineral aggregate containing both particles above 2 mm and particles within the range of 2–0.5 mm and also smaller particles, said batch of mineral aggregate being divided into at least a first and a second part, said first part being first mixed in the mixer with said batch of binder whereafter said second part is introduced into the mixer and the mixing is continued until mixing is completed, the improvement comprising dividing said batch of mineral aggregate into said first and second parts in such a way that said second part contains practically all particles of said mineral aggregate batch within the range up to 2 mm, whereby said bituminous binder and mineral aggregate produce a mixture having high homogeneity without separations in the mineral aggregate composition and without agglomeration of particle sizes within the range up to 2 mm.

* * * * *